United States Patent Office 3,340,149
Patented Sept. 5, 1967

3,340,149
COMPOSITION FOR THE TREATMENT OF HYPERGLYCEMIA CONTAINING A α-PHENYL-β-HYDROXY-β-PYRIDYL-ACRYLONITRILE
Gordon Northrop Walker, Morristown, N.J., assignor to Ciba Corporation, New York, N.Y., a corporation of Delaware
No Drawing. Filed July 23, 1965, Ser. No. 474,468
8 Claims. (Cl. 167—65)

This application is a continuation-in-part of Ser. No. 466,842, filed June 24, 1965, now abandoned.

The present invention provides new pharmaceutical preparations capable of decreasing the sugar content of the blood, as well as a new method for the treatment of hyperglycemia.

It is known that α-phenyl-β-hydroxy-β-pyridyl-acrylonitriles of the formula

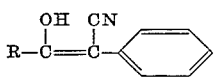

in which R stands for 2-, 3- or 4-pyridyl, have been prepared as intermediates for the preparation of α-substituted β-pyridyl-ethylamines or pyridyl benzyl ketones respectively [A. Burger and C. R. Walter, J. Amer. Chem. Soc. 72, 1988 (1950) and L. Kulczynski et al., Dissertationes Pharm. 13, 299 (1961).]

I have now found that pharmaceutical preparations containing said compounds, or a pharmaceutically acceptable metal or acid addition salt thereof, as the active ingredient, interfere with the carbohydrate metabolism and cause a fall in the sugar content of the blood. This can be demonstrated in glucose primed intact or adrenalectomized rats over an oral dosage range between about 10 to 200 mg./kg.

I also have found a new method for the treatment of hyperglycemia, e.g. diabetes, which comprises administering to a host requiring relief from hyperglycemia, a preparation consisting essentially of a pharmacologically effective amount of an α-phenyl-β-hydroxy-β-pyridyl-acrylonitrile, or a pharmaceutically acceptable salt thereof, together with a pharmaceutical excipient, preferably such for oral use. The pharmacologically effective amount of said active ingredients is, for example, within the range of about 0.25 and 3.0 g., preferably of about 0.5 and 1.0 g. per day.

Pharmaceutically acceptable metal salts of the α-phenyl-β-hydroxy-β-pyridyl-acrylonitriles are preferably alkali or alkaline earth metal salts, such as sodium, potassium or calcium salts. Acid addition salts of said nitriles are, for example, those with non-toxic inorganic acids, e.g. hydrochloric, hydrobromic, nitric, sulfuric or phosphoric acid, or organic acids, such as carboxylic or sulfonic acids, e.g. acetic, propionic, glycolic, malonic, succinic, maleic, hydroxylmaleic, fumaric, malic, tartaric, citric, glucuronic, benzoic, salicylic, 4-amino-salicylic, 2-acetoxybenzoic, pamoic, nicotinic, isonicotinic, methane sulfonic, ethane sulfonic, ethane 1,2-disulfonic, 2-hydroxyethane sulfonic, benzene sulfonic, toluene sulfonic or naphthalene 2-sulfonic acid, methionine, tryptophan, lysine or arginine.

The preparations of this invention are generally prepared according to methods used in the art of manufacturing pharmaceutical preparations, essentially by combining specified proportions of the pharmacologically active ingredient with a pharmaceutically acceptable organic or inorganic carrier. Usually, the preparations of this invention contain at most equal amounts of the active ingredient and the inert carrier; preferably, they are made up to have from about 1 percent to at most 50 percent by weight of the pharmacologically active ingredient in the preparations. In those for oral use (e.g. tablets or capsules), the percentage by weight is from about 5 percent to at most 50 percent of the active ingredient. In those for injections (e.g. solutions), the percentage by weight is from about 1 percent to about 20 percent of the active ingredient.

In preparing pharmaceutically acceptable dosage unit forms, any one of a wide variety of preparations may be manufactured, such as tablets, capsules, pills, suppositories, solutions or suspensions. In addition of the pharmacologically active component, there may be present additional substances, commonly employed in the art of manufacturing pharmaceutically acceptable dosage unit compositions. These may include excipients, binders, fillers, lubricants, solvents, stabilizers, wetting agents, emulsiers, buffers, and/or other inert ingredients. Examples of these materials, especially for the orally applicable preparations, are the following: starches, e.g. corn starch or wheat starch, sugars e.g. lactose or sucrose, stearic acid, magnesium or calcium stearate, aluminum magnesium silicate preparations (colloidal silica preparations), talc tragacanth, acacia or polyethylene glycol. The quantities of these ingredients may vary widely and depend upon the characteristics and the size of the desired, orally applicable form, and/or the method of its manufacture. Encapsulation may be effected using, if necessary, the same excipients as those employed for the preparation of other orally applicable forms, e.g. tablets. Any compatible colors, approved and certified under the provisions of the Federal Food, Drug and Cosmetic law may be used as a means of identification.

Primary solvents of the solutions for injection according to this invention are water, water-miscible organic solvents, such as lower alkanols, e.g. ethanol, or mixtures of water and water-miscible organic solvents. Other ingredients are added to ensure stable solutions for injection, for example, stabilizers, such as anti-oxidants, e.g. thiourea, sodium sulfide, sodium metabisulfite, ascorbic acid, cysteine hydrochloride, sodium formaldehyde sulfoxylate, mono-thioglycerol or thiosorbitol, solubilizers, e.g. N,N-diethylacetamide, polyethyleneglycol, ureas or urethanes, buffers and buffer combinations to maintain a preferable pH of about 7, such as, for example, acetic acid, potassium phthalate and sodium hydroxide, potassium dihydrogen phosphate and disodium hydrogen phosphate, potassium dihydrogen phosphate and sodium hydroxide or acetic acid and sodium acetate, salts for making isotonic solutions, e.g. sodium chloride, or any other suitable auxiliary substances.

The following working examples are illustrative of the invention, but are in no way intended to limit its scope.

Example 1

Preparation of 2000 tablets each containing 0.5 g. of the active ingredient.

Ingredients:
| | |
|---|---|
| α - phenyl - β-hydroxy-β-(3-pyridyl)-acrylonitrile _____ g__ | 1000.0 |
| Sterotex _____ g__ | 88.0 |
| Alginic acid _____ g__ | 42.0 |
| Cellulose acetate phthalate _____ g__ | 300.0 |
| Anhydrous ethanol _____ ml__ | 332.0 |
| Acetone _____ ml__ | 332.0 |

Procedure.—The nitrile, sterotex and alginic acid are passed through a 20 mesh screen and mixed for 30 minutes. The phthalate is dissolved in the ethanol-acetone mixture and with the solution the powders are wetted and mixed thoroughly. The granulate is dried with warm air, passed through a 16 mesh screen and compressed into tablets using 13/32" diameter dies, modified ball punches.

Example 2

Preparation of 1000 tablets each containing 0.755 g. of the active ingredient.

Ingredients: G.
- α - phenyl - β-hydroxy-β-(3-pyridyl)-acrylonitrile _____ 755.0
- Microcrystalline cellulose _____ 109.0
- Polyethylene glycol 6000 powder _____ 18.0
- Polyvinyl alcohol powder _____ 18.0
- 50% aqueous ethanol, q.s.

*Procedure.*—The nitrile and polyvinyl alcohol are passed through a 20 mesh screen, mixed with the cellulose and the mixture is moistened with the ethanol. The granulate is dried with warm air, passed through a 12 mesh screen, mixed with the polyethylene glycol and compassed into tablets using $14/32''$ diameter dies, modified ball punches.

Example 3

Preparation of 3000 enteric coated tablets each containing 0.365 g. of the active ingredient.

Ingredients for the core: G.
- α-Phenyl-β-hydroxy-β-(3-pyridyl)-acrylonitrile _____ 1095.0
- Arrowroot starch _____ 67.5
- Tragacanth _____ 13.5
- Talc _____ 67.5
- Lactose _____ 79.5
- Corn starch _____ 13.5
- Stearic acid _____ 13.5
- Purified water, q.s.

*Procedure I.*—The nitrile, arrowroot starch, tragacanth, talc and lactose are screened through a 20 mesh screen and mixed for 20 minutes. The corn starch is suspended in 13.5 ml. cold water and added to 54 ml. boiling water. The paste obtained is added to the powder, if necessary, with additional water and the whole is mixed for 30 minutes. The moist mass is passed through an 8 mesh screen and dried in a circulating air oven at 40°. The granulate is passed through a 15 mesh screen, mixed with the stearic acid and compressed into tablets using $12/32''$ deep concave punches and dies.

Ingredients for the coating:
- Ethyl acetate _____ ml __ 1200
- 3A ethanol _____ ml __ 1170
- Ethyl lactate _____ ml __ 360
- Cellulose acetate phthalate _____ g __ 270
- Flour _____ g __ 240
- Sugar syrup 36° Baumé _____ ml __ 2000
- Sucrose _____ g __ 2250
- Purified water _____ ml __ 1200

*Procedure II.*—The tablets obtained are placed into a coating pan and 3 coats of the syrup (prepared from water, sugar, flour and the above syrup) are applied at 50°; each coat is dusted with dry flour while allowed to rotate until dry. Thereupon several coats with a solution of the cellulose acetate phthalate in the above organic solvents are applied while dried with cold air using talcum, if necessary, to take up tack. The finish is made with plain sugar syrup whereupon the tablets are placed in a dryer overnight. They are then placed into a polishing pan, dusted with carnauba wax while rotating until the tablet surface is glossy.

Example 4

Preparation of 1000 capsules each containing 0.5 g. of the active ingredients.

Ingredients: G.
- α-Phenyl-β-hydroxy-β-(3-pyridyl)-acrylonitrile _____ 500.0
- Lactose _____ 280.0

*Procedure.*—The ingredients are passed through a 40 mesh screen, mixed thoroughly and 780 mg. thereof filled into each No. 0 gelatin capsule.

The active ingredient used in the examples herein may be prepared as follows:

10.1 g. sodium are dissolved in methanol, and most of the methanol is removed in vacuo. To the concentrated sodium methoxide solution 46.8 g. phenyl-acetonitrile and 66.5 g. ethyl nicotinate are added while stirring, whereupon the formation of a thick, yellow paste occurs. After stirring for ¾ of an hour, the suspension is allowed to stand at room temperature overnight, protected from moisture. The gelatinous salt is dissolved in water, and the crude enol isolated by gradual addition of 18% hydrochloric acid to the chilled aqueous solution. The crude crystals are washed with water and air dried. After trituration with diethyl ether and re-drying, 58.3 g. of a α-phenyl-β-hydroxy-β-(3-pyridyl)-acrylonitrile are obtained. It is recrystallized from aqueous ethanol by dissolving it in the minimum amount of ethanol at room temperature and diluting the solution with water nearly to the cloud point. After standing overnight nearly colorless crystals precipitate melting at 147–150°.

The α-phenyl-β-hydroxy-β-(3-pyridyl)-acryonitrile hydrochloride is prepared in methanolic solution using methanolic hydrochloric acid. It is recrystallized from methanol-diethyl ether and melts at 200–203°. It can be used in the above examples instead of the equivalent amount of the free compound.

In the previous examples the active ingredients may be replaced by the same amount of α-phenyl-β-hydroxy-β-(4-pyridyl) - acrylonitrile or α-phenyl-β-hydroxy-β-(2-pyridyl)-acrylonitrile or all of said compounds may be used in the equivalent amount of a therapeutically acceptable acid addition salt, e.g. the hydrochloride.

What is claimed is:

1. A pharmaceutical preparation, in oral unit dosage form selected from the group consisting of tablets, capsules and pills, capable of decreasing the sugar content of the blood consisting essentially of about 5 to 50% by weight of a member selected from the group consisting of an α-phenyl-β-hydroxy-β-pyridyl-acrylonitrile having the formula $$R-\underset{|}{\overset{OH}{C}}=\underset{|}{\overset{CN}{C}}-\phenyl$$

in which R stands for a member selected from the group consisting of 2-pyridyl, 3-pyridyl and 4-pyridyl, a pharmaceutically acceptable metal salt and an acid addition salt thereof, together with a pharmaceutical excipient.

2. A pharmaceutical preparation as claimed in claim 1, wherein the active ingredient is a α-phenyl-β-hydroxy-β-(3-pyridyl)-acrylonitrile.

3. A pharmaceutical preparation as claimed in claim 1, wherein the active ingredient is α-phenyl-β-hydroxy-β-(3-pyridyl)-acrylonitrile hydrochloride.

4. A pharmaceutical preparation as claimed in claim 1, wherein the active ingredient is α-phenyl-β-hydroxy-β-(4-pyridyl)-acrylonitrile.

5. A pharmaceutical preparation as claimed in claim 1, wherein the active ingredient is α-phenyl-β-hydroxy-β-(4-pyridyl)-acrylonitrile hydrochloride.

6. A pharmaceutical preparation as claimed in claim 1, wherein the active ingredient is α-phenyl-β-hydroxy-β-(2-pyridyl)-acrylonitrile.

7. A pharmaceutical preparation as claimed in claim 1, wherein the active ingredient is α-phenyl-β-hydroxy-β-(2-pyridyl)-acrylonitrile hydrochloride.

8. A pharmaceutical preparation as claimed in claim 1, wherein the active ingredient amounts to about 0.25 to about 3.0 g. per oral unit dose.

(References on following page)

References Cited

Kuczynski et al.: Dissertationes Pharmaceuticae, vol. 13, No. 4, pages 299–304 (1961).

Burger et al.: Journal of American Chemical Society, vol. 72, May–August 1950, pages 1988–1990.

ALBERT T. MEYERS, *Primary Examiner.*

SAM ROSEN, JULIAN S. LEVITT, *Examiners.*

J. GOLDBERG, *Assistant Examiner.*